Aug. 22, 1933.  C. D. STEWART ET AL  1,923,173
AUTOMOTIVE BRAKE
Filed Nov. 12, 1931
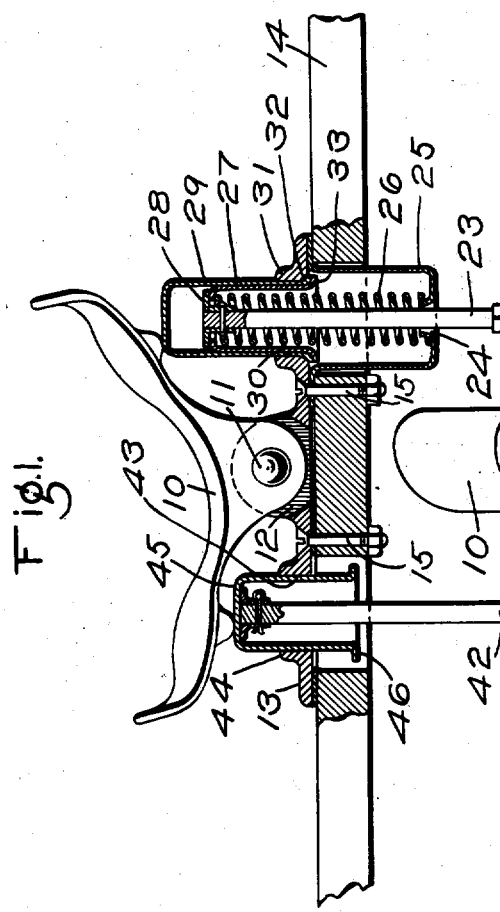
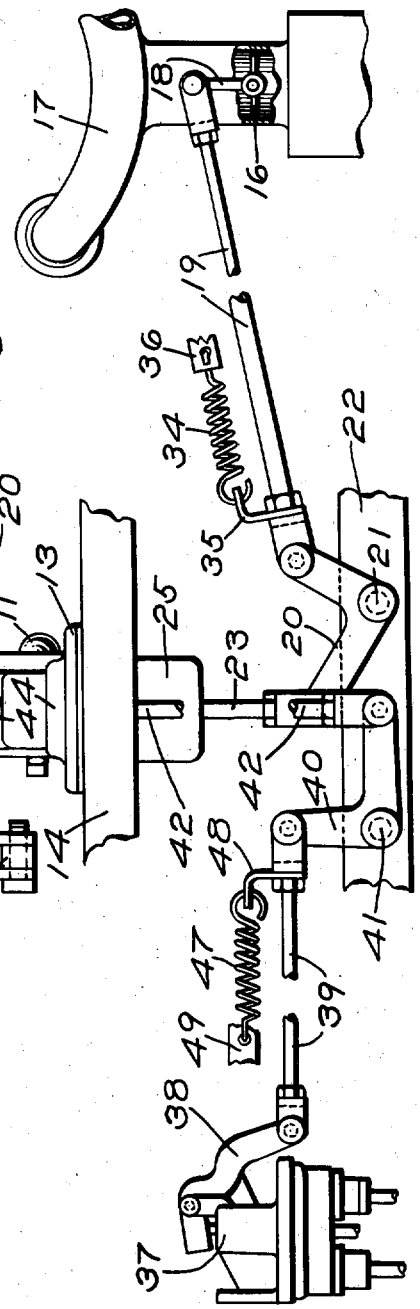
INVENTORS
CARLTON D. STEWART
AND HOWARD R. HUGHES
BY
Wm. M. Cady
ATTORNEY Patented Aug. 22, 1933

UNITED STATES PATENT OFFICE 1,923,173

1,923,173

AUTOMOTIVE BRAKE

Carlton D. Stewart, Berkeley, and Howard R. Hughes, Oakland, Calif., assignors to The Westinghouse Air Brake Company, Wilmerding, Pa., a Corporation of Pennsylvania Application November 12, 1931
Serial No. 574,476

4 Claims. (Cl. 192—3)

This invention relates to pedal operated mechanisms, more particularly adapted for controlling the power and braking of a motor vehicle.

One object of the present invention is the provision of means, in the form of a treadle device, operative in one direction to effect acceleration of the vehicle engine and the release of the brakes and operative in the other direction to effect deceleration of the engine and an application of the brakes.

A further object of the invention is the provision of a rockable control element and spring actuated means to effect a partial application of the brakes when the vehicle is parked or the engine operating at idling speed.

A more specific object resides in the provision of a rockable foot controlled element adapted to selectively operate the brake or accelerator mechanisms without necessitating the removal of the operator's foot from the control element.

Other objects and advantages will appear from the following description of an illustrative embodiment of the present invention.

In the drawing; Fig. 1 is a diagrammatic view of a brake and accelerator control apparatus for a motor vehicle and embodying our invention; Fig. 2 is a side elevational view of the treadle showing its mounting means and cooperating parts of the brake and accelerator mechanisms in section.

The apparatus illustrated in the accompanying drawing, comprises a treadle 10 rockably supported on a pin 11 which is carried by an upstanding lug 12 formed on a mounting bracket 13. The mounting bracket is anchored to any suitable support, such as a floor board 14, by means of bolts 15. Brake and accelerator mechanisms are mounted beneath the treadle 10 in such manner as to make them responsive to treadle movement for respectively operating their associated elements.

The accelerator mechanism comprises a butterfly valve 16 which is located in an engine intake manifold 17 and operated by a lever 18 in the usual manner. A link 19 connects the lever 18 with one arm of a bell crank 20 which is rockably mounted on a pin 21 carried by a fixed support 22. A rod 23, which is pivotally connected to the other arm of the bell crank 20, extends upwardly through an aperture 24 formed in the lower end of a casing 25. A coil spring 26 which surrounds the rod 23 is confined between the casing 25 and a thimble 27 by the application of a collar 28 to the upper extremity of the rod 23. A hollow cap 29 is guided in an opening 30 formed in a boss 31 on the mounting bracket 13. This cap 29 serves to receive and guide the thimble 27. An outwardly directed flange 32 formed on the cap 29 abuts the under face of the mounting bracket 13 to limit the upward movement of the cap and a similarly formed flange 33 on the thimble 27 is adapted under pressure of the coil spring 26 to engage the flange 32 to limit the upward movement of the thimble 27. A coil spring 34 is operatively connected in the linkage through which the butterfly valve 16 is operated to normally urge the valve 16 to an idling position in the intake manifold 17 and simultaneously retains the rod 23 in its normal elevated position. The tension coil spring 34 may be connected to any suitable place in the linkage and for illustrative purposes we have chosen to apply one end of it to the link 19 by means of a suitable bracket 35, while the other end is secured to a fixed support 36.

The brake actuating mechanism comprises a brake control valve device 37 of standard form and associated with the brake system in the usual well known manner. The brake valve device 37 is provided with an operating lever 38. A link 39 connects the lever 38 with one arm of a bell crank 40 which is rockably supported on a pin 41 carried by the fixed support 22. A rod 42 which is pivotally connected to the other arm of the bell crank 40 extends upwardly through a hole in the floor board 14 and is guided in a bore 43 formed in a boss 44 on the mounting bracket 13 by a thimble cap 45 which is suitably retained upon the upper extremity of the rod 42. An outwardly directed flange 46 formed on the cap 45 serves to abut the mounting bracket 13 to limit the upward movement of the rod 42. A tension spring 47 is operatively connected in the linkage which actuates the brake valve device 37 to urge the brake valve operating lever 38 toward its release position. In the present instance we have applied one end of the spring 47 to a bracket 48 carried by the link 39, while the other end of the spring is secured to a fixed support 49.

It has been deemed expedient to provide for a partial automatic application of the brakes in the present system. The advantages gained by this design are very beneficial in that a partial brake application is effected upon retarding the speed of the engine by relieving pressure on the accelerator portion of the treadle without shifting the foot sidewise to the normal brake controlling position. By reason of this condition shorter stops may be made.

In operation, the accelerator may be operated to increase the power of the engine by placing the foot on the right hand or accelerator side of the treadle 10 and depressing the foot. The initial downward movement of the accelerator portion of the treadle 10 will urge the cap 29 downwardly and cause the spring 26 to be compressed under the action of the thimble 27. During this operation the coil spring 47 will urge the lever 38 to its release position and simultaneously raise the rod 42 until the flange 46 engages the bottom of the mounting bracket to limit its upward movement. When this position is reached the brakes are completely released and the cap 29 will have reached the point of contacting with the upper extremity of the rod 23, which has been retained in its uppermost position by the action of the spring 34. Continued pressure on the right hand side of the treadle will cause the butterfly valve 16 to be opened by action of the bell crank 20, link 19, and lever 18 to speed up the engine in the usual manner.

When it is desired to effect an application of the brakes, the pressure of the foot on the accelerator side of the treadle 10 is relieved so as to move the butterfly valve 16 to its idling position under the action of the coil spring 34. At the time that the rod 23 reaches its uppermost position under the action of the coil spring 34, the spring 26 will cause the thimble 27 to continue upwardly until its upper end engages the collar 28 carried by the rod 23. During this movement of the thimble 27 the cap 29 will be urged upwardly by reason of the contact between the flanges 33 and 32 formed respectively on thimble 27 and cap 29. The action of the coil spring 26 will continue to move the cap 29 upwardly until the flange 32 contacts with the lower face of the mounting bracket 13. As the cap 29 is moved away from contact with the upper extremity of the rod 23, the left hand or brake side of the treadle will engage the thimble cap 45 which is mounted on the rod 42 and the rod 42 will be depressed to effect a movement of the brake valve lever 38 through the bell crank 40 and link 39 so that the brake valve device is operated in the usual manner to supply fluid under pressure for effecting an application of the brakes.

If further application of the brakes is desired the foot is shifted to the left hand side of the treadle 10 and is moved downwardly to depress that portion of the treadle. Continued downward movement of the brake portion of the treadle, will cause the rod 42 to be further depressed so that the brake valve device is further operated to supply fluid under pressure to thereby apply the brakes with greater force.

The application of the brakes in the above noted manner will have no effect upon the accelerator portion of the device due to the fact that the spring 34 will retain the valve 16 in its idling position.

A partial release of the brakes may be effected by simply relieving foot pressure upon the brake side of the treadle 10 which will permit the spring 47 to urge the brake mechanism to its normal partial application position.

To completely release the brakes the foot must be moved to the accelerator side of the treadle and the treadle depressed until the stop 46 on the rod abuts the lower face of the mounting bracket 13. At this time, the inner face of the cap 29 will lie adjacent the upper extremity of the rod 23 so that the brakes are completely released and the valve 16 is retained in its idling position.

The use of the usual hand throttle control in conjunction with the present invention is anticipated and it will be understood that it may be retained in its present form without conflicting in any manner with the successful operation of the apparatus hereinabove described.

It will be seen from the foregoing specification that a simple and effective means have been provided for placing the accelerator and brake mechanisms of a motor vehicle under a control element which is rockable in one direction for effecting acceleration of the vehicle and rockable in the other direction for actuating the brakes and including means for effecting an application of the brakes upon retarding the acceleration of the vehicle.

While the invention has been described in considerable detail in the foregoing specification, it is understood that various changes may be made in its embodiment without departing from or sacrificing any of the advantages hereinafter claimed.

Having now described our invention, what we claim as new and desire to secure by Letters Patent, is:

1. In a power and brake controlling apparatus for a motor vehicle, the combination with brake controlling means and power controlling means, of a pedal device having two lever arms, one of which is depressible to operate said power controlling means and the other of which is depressible to operate said brake controlling means, a spring, and a member operated by said power controlling lever arm for first compressing said spring and for then operating said power controlling means.

2. In a power and brake controlling apparatus for a motor vehicle, the combination with brake controlling means and power controlling means, of a pedal device having two lever arms, one of which is depressible to operate the power controlling means and the other of which is depressible to operate the brake controlling means, a spring, and a member operable by said power controlling lever arm and subject to the pressure of said spring for operating said power controlling means upon a predetermined movement of said member relative to said power controlling means.

3. In a motor vehicle the combination with brake and accelerator operating mechanisms, of a rockable treadle, the brake operating mechanism including a rod, a stop on said rod for limiting its movement in one direction and a spring normally tending to maintain said rod in its limited position, the accelerator mechanism including an accelerator rod, a stop on said accelerator rod, and a spring normally tending to retain said accelerator rod in its limited position, said rockable treadle normally contacting with both of said rods and movable in one direction for actuating said brake operating mechanism and movable in the opposite direction for actuating said accelerator operating mechanism.

4. In a motor vehicle the combination with brake and accelerator operating mechanisms, of a treadle normally engaging the brake and accelerator operating mechanisms, a pivot for rockably supporting said treadle, a spring on the brake mechanism tending to urge one side of the treadle upwardly, a spring on the accelerator mechanism tending to urge the other side of said treadle upwardly, said second named spring being of sufficient strength to overcome said first named spring and retain the brake operating mechanism in a brake application position while the accelerator operating mechanism is in an idling position, said treadle being manually operable in one direction to increase the brake application and being operable in the other direction to release the brake application and effect movement of the accelerator mechanism to vary the speed of the engine.

CARLTON D. STEWART.
HOWARD R. HUGHES.